US011055495B2

(12) United States Patent
Tsunomori

(10) Patent No.: US 11,055,495 B2
(45) Date of Patent: Jul. 6, 2021

(54) UTTERANCE SENTENCE GENERATION SYSTEM AND UTTERANCE SENTENCE GENERATION PROGRAM

(71) Applicant: NTT DOCOMO, INC., Chiyoda-ku (JP)

(72) Inventor: Yuiko Tsunomori, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 16/640,104

(22) PCT Filed: Nov. 13, 2018

(86) PCT No.: PCT/JP2018/041958
§ 371 (c)(1),
(2) Date: Feb. 19, 2020

(87) PCT Pub. No.: WO2019/098185
PCT Pub. Date: May 23, 2019

(65) Prior Publication Data
US 2021/0133398 A1 May 6, 2021

(30) Foreign Application Priority Data
Nov. 16, 2017 (JP) .............................. JP2017-220731

(51) Int. Cl.
*G06F 40/40* (2020.01)
*G10L 13/00* (2006.01)

(52) U.S. Cl.
CPC .................................. *G06F 40/40* (2020.01)

(58) Field of Classification Search
CPC ........ G06F 16/9035; G06F 3/16; G06F 16/90;
G06F 17/28; G10L 13/00; G10L 15/10;
G10L 5/22
(Continued)

(56) References Cited

FOREIGN PATENT DOCUMENTS

JP          2014-219872 A     11/2014

OTHER PUBLICATIONS

International Preliminary Report on Patentability and Written Opinion dated May 28, 2020 in PCT/JP2018/041958 (English Translation only), 6 pages.

(Continued)

*Primary Examiner* — Thierry L Pham
(74) *Attorney, Agent, or Firm* — Oblon, McClelland, Maier & Neustadt, L.L.P.

(57) ABSTRACT

An utterance sentence generation system, which is a system that outputs an utterance sentence for responding to an utterance which is input by a user, includes a focus extraction unit that extracts focus information representing at least a portion of subject matter in the user's utterance which is input by the user, on the basis of the user's utterance, an interest state estimation unit that estimates an interest state indicating a degree of the user's interest in the subject matter represented by the focus information, a number of connected sentences determination unit that determines the number of utterance sentences to be connected, on the basis of the interest state, a connected utterance sentence generation unit that generates a connected utterance sentence by connecting utterance sentences corresponding to the number determined by the number of connected sentences determination unit, and an utterance sentence output unit that outputs the connected utterance sentence.

15 Claims, 9 Drawing Sheets

(58) Field of Classification Search
USPC .............................................. 704/9
See application file for complete search history.

(56) References Cited

OTHER PUBLICATIONS

International Search Report dated Jan. 29, 2019 in PCT/JP2018/041958 filed on Nov. 13, 2018.

(a)

(b)

| FOCUS INFORMATION | UTTERANCE SENTENCE |
|---|---|
| MEAL | I AM HUNGRY. |
| MEAL | WHAT DO YOU WANT TO HAVE FOR DINNER? |
| MEAL | NOW IS THE BEST SEASON FOR THE BAMBOO SHOOTS. |
| ⋮ | ⋮ |

UTTERANCE SENTENCE GENERATION SYSTEM AND UTTERANCE SENTENCE GENERATION PROGRAM

TECHNICAL FIELD

The present invention relates to an utterance sentence generation system and an utterance sentence generation program.

BACKGROUND ART

Systems for having a conversation with users have become known. In such systems, it is possible to cope with various problems, and an appropriate utterance sentence is output in response to an utterance input by a user. For example, a system for extracting appropriate words, phrases, and sentences acquired from the Web, a SNS, and the like to constitute an appropriate utterance for responding to a user has become known (see, for example, Patent Literature 1).

CITATION LIST

Patent Literature

Patent Literature 1: Japanese Unexamined Patent Publication No. 2014-219872

SUMMARY OF INVENTION

Technical Problem

However, when an utterance is constituted using sentences and the like acquired from the Web and the like, the contents of a response to a user may become monotonous. In addition, it is conceivable that a plurality of sentences and the like may be connected to each other to be used for a user's response in order to ameliorate the monotonousness of response contents. However, in a case where the length of connected utterance sentences is not appropriate, the monotonousness may not be able to be eliminated, or connected utterance sentences may become redundant.

Consequently, the invention is contrived in view of such situations, and an object thereof is to provide an utterance sentence generation device and an utterance sentence generation program which are capable of outputting an utterance sentence having an appropriate length when an utterance sentence for responding to a user is generated by connecting a plurality of sentences.

Solution to Problem

In order to solve the above-described problem, an utterance sentence generation device according to an aspect of the invention, which is a system that outputs an utterance sentence for responding to an utterance which is input by a user, includes a focus extraction unit that extracts focus information representing at least a portion of subject matter in the user's utterance which is input by the user, on the basis of the user's utterance, an interest state estimation unit that estimates an interest state indicating a degree of the user's interest in the subject matter represented by the focus information, a number of connected sentences determination unit that determines the number of utterance sentences to be connected, on the basis of the interest state, a connected utterance sentence generation unit that generates a connected utterance sentence by connecting utterance sentences corresponding to the number determined by the number of connected sentences determination unit, and an utterance sentence output unit that outputs the connected utterance sentence.

In addition, an utterance sentence generation program according to another aspect of the invention, which is an utterance sentence generation program for causing a computer to function as an utterance sentence generation system that outputs an utterance sentence for responding to an utterance which is input by a user, causes the computer to realize a focus extraction function of extracting focus information representing at least a portion of subject matter in the user's utterance which is input by the user, on the basis of the user's utterance, an interest state estimation function of estimating an interest state indicating a degree of the user's interest in the subject matter represented by the focus information, a number of connected sentences determination function of determining the number of utterance sentences to be connected, on the basis of the interest state, a connected utterance sentence generation function of generating a connected utterance sentence by connecting utterance sentences corresponding to the number determined by the number of connected sentences determination function, and an utterance sentence output function of outputting the connected utterance sentence.

According to the above-described aspect, focus information representing subject matter of the user's utterance is extracted, and the number of sentences to be connected is determined in accordance with the degree of the user's interest in the focus information. Thereby, a connected utterance sentence with an appropriate length in which the degree of the user's interest is reflected is output.

Advantageous Effects of Invention

It is possible to provide an utterance sentence generation device and an utterance sentence generation program which are capable of outputting an utterance sentence having an appropriate length when an utterance sentence for responding to a user is generated by connecting a plurality of sentences.

DESCRIPTION OF EMBODIMENTS

Figure 1:
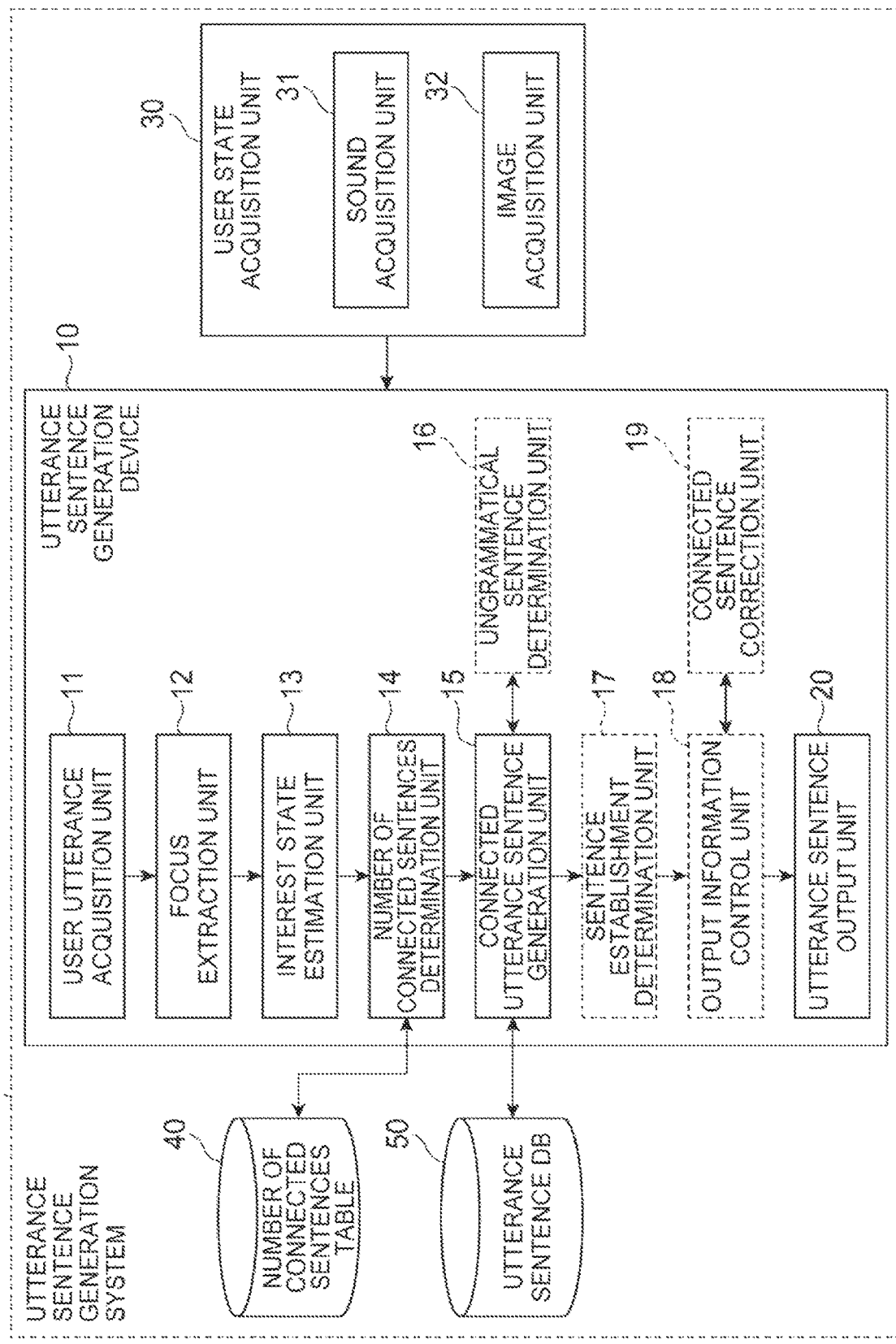
FIG. 1 is a block diagram illustrating a functional configuration of an utterance sentence generation system including an utterance sentence generation device of the present embodiment.

An embodiment of an utterance sentence generation device according to the invention will be described with reference to the accompanying drawings. Meanwhile, the same portions are denoted by the same reference numerals and signs when possible, and repeated description will be omitted.

FIG. 1 is a diagram illustrating a functional configuration of an utterance sentence generation system 1 including an utterance sentence generation device 10 according to the present embodiment. The utterance sentence generation device 10 is a device that outputs an utterance sentence for responding to an utterance which is input by a user.

The utterance sentence generation system 1 of the present embodiment outputs an utterance sentence using sound, text, and the like in accordance with a user's utterance for which no particular assumptions are made regarding the contents thereof, such as for example a chat, instead of being used for a specific purpose such as presentation of a route to a destination. Although a device constituting the utterance sentence generation system 1 or the utterance sentence generation device 10 is not limited, the system or the device may be constituted by a device such as a portable terminal and a personal computer or may be constituted by a robot in which a computer is embedded.

As illustrated in FIG. 1, the utterance sentence generation system 1 includes an utterance sentence generation device 10, a user state acquisition unit 30, a number of connected sentences table 40 and an utterance sentence DB 50.

The utterance sentence generation system 1 may be configured as one device, or one or two or more of the utterance sentence generation device 10, the user state acquisition unit 30, the number of connected sentences table 40 and utterance sentence DB 50 may constitute one device. As an example, the user state acquisition unit 30 may be configured as one terminal, and the utterance sentence generation device 10, the number of connected sentences table 40 and the utterance sentence DB 50 may be constituted by a server. In addition, as another example, the utterance sentence generation device 10 and the user state acquisition unit 30 may be configured as one terminal. Storage means of each of the number of connected sentences table 40 and the utterance sentence DB 50 may be configured as a device having any configuration as long as the storage means is configured to be able to be accessed by the utterance sentence generation device 10.

In the present embodiment, a terminal constituting the user state acquisition unit 30 or a terminal constituting the utterance sentence generation device 10 and the user state acquisition unit 30 is configured as a portable terminal such as a high performance mobile phone (smartphone) or a mobile phone.

As illustrated in FIG. 1, the utterance sentence generation device 10 functionally includes a user utterance acquisition unit 11, a focus extraction unit 12, an interest state estimation unit 13, a number of connected sentences determination unit 14, a connected utterance sentence generation unit 15, an ungrammatical sentence determination unit 16, a sentence establishment determination unit 17, an output information control unit 18, a connected sentence correction unit 19 and an utterance sentence output unit 20. In addition, the user state acquisition unit 30 includes a sound acquisition unit 31 and an image acquisition unit 32. These functional units will be described later.

Meanwhile, the block diagram illustrated in FIG. 1 represents blocks in units of functions. These functional blocks (constituent elements) are realized by any combination of hardware and/or software. In addition, means for realizing each functional block is not particularly limited. That is, each functional block may be realized by one device which is physically and/or logically coupled, or may be realized by two or more devices which are physically and/or logically separated from each other by accessing the plurality of devices directly and/or indirectly (for example, in a wired manner and/or wirelessly).

Figure 2:
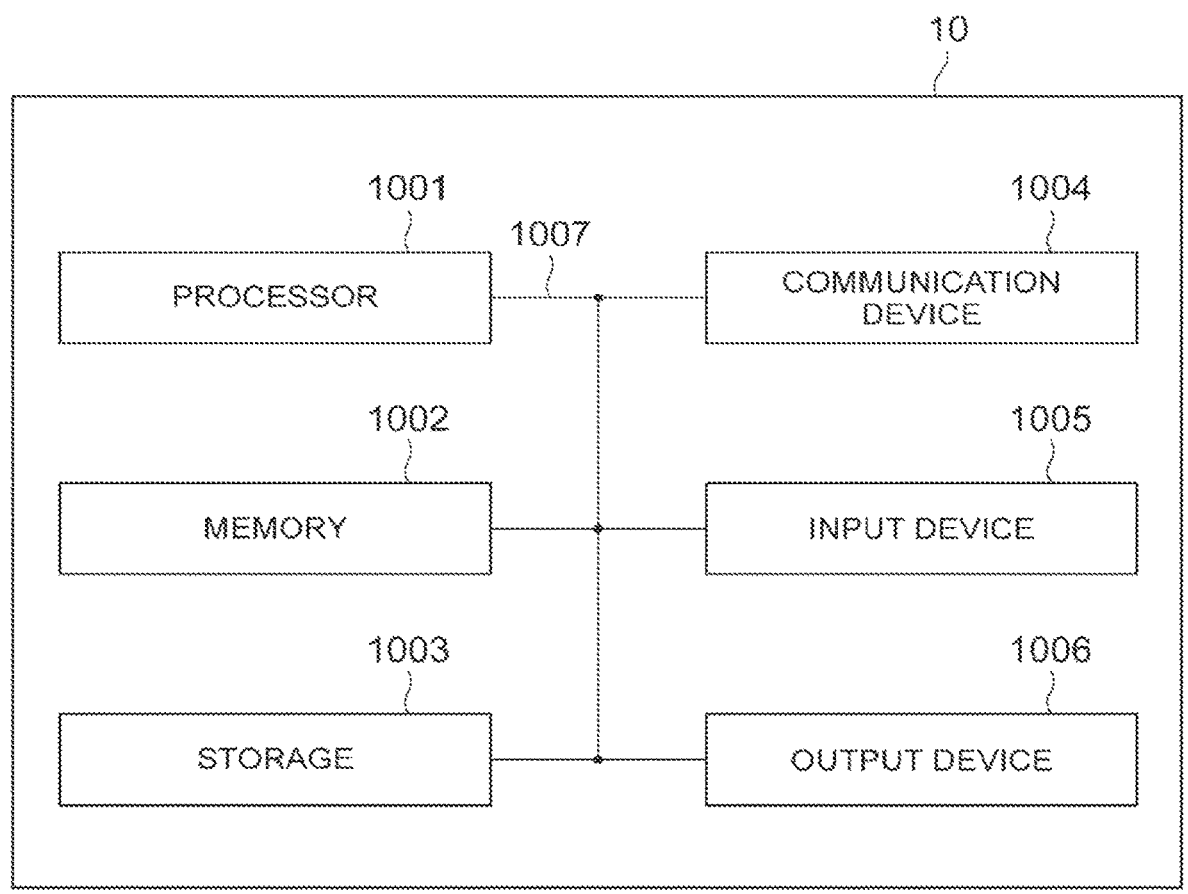
FIG. 2 is a hardware block diagram of the utterance sentence generation device.

For example, the utterance sentence generation device 10 in the embodiment of the invention may function as a computer. FIG. 2 is a diagram illustrating an example of a hardware configuration of the utterance sentence generation device 10 according to the present embodiment. The utterance sentence generation device 10 may be physically configured as a computer device including a processor 1001, a memory 1002, a storage 1003, a communication device 1004, an input device 1005, an output device 1006, a bus 1007, and the like.

Meanwhile, in the following description, the wording "device" may be replaced by a circuit, a device, a unit, or the like. The hardware configuration of the utterance sentence generation device 10 may be configured to include one or a plurality of the devices illustrated in FIG. 2, or may be configured without including some of these devices.

The processor 1001 performs an arithmetic operation by reading predetermined software (program) on hardware such as the processor 1001 or the memory 1002, and thus each function in the utterance sentence generation device 10 is realized by controlling communication in the communication device 1004 or reading and/or writing of data in the memory 1002 and the storage 1003.

The processor 1001 controls the whole computer, for example, by operating an operating system. The processor 1001 may be constituted by a central processing unit (CPU) including an interface with a peripheral device, a control device, an arithmetic operation device, a register, and the like. For example, the functional units 11 to 20 illustrated in FIG. 1 may be realized by the processor 1001.

In addition, the processor 1001 reads out a program (program code), a software module or data from the storage 1003 and/or the communication device 1004 into the memory 1002, and executes various types of processes in accordance therewith. An example of the program which is used includes a program causing a computer to execute at least some of the operations described in the above-described embodiment. For example, the functional units 11 to 13 of the utterance sentence generation device 10 may be stored in the memory 1002, and may be realized by a control program which is operated by the processor 1001. The execution of various types of processes described above by one processor 1001 has been described, but these processes may be simultaneously or sequentially executed by two or more processors 1001. The processor 1001 may be realized using one or more chips. Meanwhile, the program may be transmitted from a network through an electrical communication line.

The memory 1002 is a computer readable recording medium, and may be constituted by at least one of, for example, a read only memory (ROM), an erasable programmable ROM (EPROM), an electrically erasable programmable ROM (EEPROM), a random access memory (RAM), and the like. The memory 1002 may be referred to as a register, a cache, a main memory (main storage device), or the like. The memory 1002 can store a program (program code), a software module, or the like that can be executed in order to carry out an utterance sentence generation method according to the embodiment of the invention.

The storage 1003 is a computer readable recording medium, and may be constituted by at least one of, for example, an optical disc such as a compact disc ROM (CD-ROM), a hard disk drive, a flexible disk, a magneto-optic disc (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The foregoing storage medium may be, for example, a database including the memory 1002 and/or the storage 1003, a server, or other suitable mediums.

The communication device 1004 is hardware (transmitting and receiving device) for performing communication between computers through a wired and/or wireless network, and is also referred to as, for example, a network device, a network controller, a network card, a communication module, or the like.

The input device 1005 is an input device (such as, for example, a keyboard, a mouse, a microphone, a switch, a button, or a sensor) that receives an input from the outside. The output device 1006 is an output device (such as, for example, a display, a speaker, or an LED lamp) that executes an output to the outside. Meanwhile, the input device 1005 and the output device 1006 may be an integrated component (for example, a touch panel).

In addition, each device of the processor 1001, the memory 1002, and the like is accessed through the bus 1007 for communicating information. The bus 1007 may be constituted by a single bus, or may be constituted by different buses between devices.

In addition, the utterance sentence generation device 10 may be configured to include hardware such as a microprocessor, a digital signal processor (DSP), an application specific integrated circuit (ASIC), a programmable logic device (PLD), or a field programmable gate array (FPGA), or some or all of the respective functional blocks may be realized by this hardware. For example, the processor 1001 may be realized using at least one of these pieces of hardware.

Referring back to FIG. 1, the user state acquisition unit 30 will be described. The user state acquisition unit 30 includes the sound acquisition unit 31 and the image acquisition unit 32. The sound acquisition unit 31 acquires sound. Specifically, the sound acquisition unit 31 can acquire sound uttered by a user, and acquires sound acquired by a device such as a microphone.

The image acquisition unit 32 acquires an image. Specifically, the image acquisition unit 32 can acquire an image showing the appearance of a user, and acquires an image acquired by an imaging device such as a camera.

Subsequently, the functional units of the utterance sentence generation device 10 will be described. The user utterance acquisition unit 11 acquires a user's utterance. The user's utterance is an utterance which is input by the user. The input of the utterance is performed using, for example, sound, text, or the like. Specifically, the user utterance acquisition unit 11 acquires sound uttered by a user through, for example, the sound acquisition unit 31. In addition, the user utterance acquisition unit 11 may acquire a user's utterance as text through the input device 1005 such as a keyboard, input keys created on a touch panel, or the like. Meanwhile, in the utterance sentence generation system 1 of the present embodiment, a user's utterance can be an object for which no particular assumptions are made regarding the contents thereof, such as for example, a chat.

The focus extraction unit 12 extracts focus information representing at least a portion of subject matter in the user's utterance on the basis of the user's utterance acquired by the user utterance acquisition unit 11. The focus information is, for example, the words which play a leading role in the subject matter in the user's utterance. Various well-known techniques can be applied to the extraction of the focus information from the user's utterance, and a machine learning method such as deep learning and SVM can be used.

As an example, specifically, the focus extraction unit 12 may extract a word extracted through morphological analysis with respect to the user's utterance as a candidate for the focus information, a score may be calculated using an estimation model of the focus information based on a predetermined feature amount obtained in advance through predetermined machine learning on the basis of the predetermined feature amount extracted from the word which is a candidate for the focus information, and the focus information may be extracted on the basis of the calculated score.

The interest state estimation unit 13 estimates an interest state indicating the degree of the user's interest in the subject matter represented by the focus information. Specifically, the interest state estimation unit 13 estimates the interest state on the basis of, for example, predetermined detection, information on the state of the user. More specifically, the interest state estimation unit 13 can acquire at least one of an acoustic feature in the user's utterance, the user's gaze, the user's facial expression and contents of the user's utterance as detection information.

Various well-known techniques can be applied to the estimation of the interest state, and a machine learning method such as deep learning and SVM can be used. As an example, specifically, the interest state estimation unit 13 may calculate a score indicating the degree of the user's interest using an estimation model of an interest state based on a predetermined feature amount obtained in advance through predetermined machine learning, on the basis of a predetermined feature amount extracted from the detection information on the state of the user.

The interest state estimation unit 13 extracts a predetermined feature amount on the basis of the detection information. For example, the interest state estimation unit 13 can use the height (frequency) of a voice, the strength of a voice (sound volume) of the user and the like, which are acoustic features in the user's utterance, as feature amounts. In addition, the interest state estimation unit 13 can acquire the direction of the user's gaze, a gaze time and the like from an image of the user's eyes which is acquired through the image acquisition unit 32, and can use them as feature amounts.

In addition, the interest state estimation unit 13 can determine a facial expression on the basis of an image of the user's face which is acquired through the image acquisition unit 32 and can use the determined facial expression as a feature amount. In addition, the interest state estimation unit 13 can use contents of the user's utterance acquired through the sound acquisition unit 31 as a feature amount. Specifically, for example, the interest state estimation unit 13 can extract a word by performing morpheme analysis on the contents of the user's utterance and can use the positive/ negative degree of meaning represented by the extracted word as a feature amount.

In addition, the interest state estimation unit 13 can use information capable of being acquired from a device used by the user as a feature amount. Specifically, for example, the interest state estimation unit 13 may estimate an interest state on the basis of profile information of the user. Examples of the profile information of the user include a Web browsing history of the user, a point of interface (POI), and the like. The interest state estimation unit 13 can extract a word by performing morphological analysis on a Web browsing history, a POI visit history, and the like and can use the degree of association between the extracted word and subject matter shown in the focus information and the frequency of the word as feature amounts.

The number of connected sentences determination unit 14 determines the number of utterance sentences to be connected, on the basis of the estimated interest state. As an example, specifically, the number of connected sentences determination unit 14 determines the number of utterance sentences to be connected, with reference to the number of connected sentences table 40.

Figure 3:
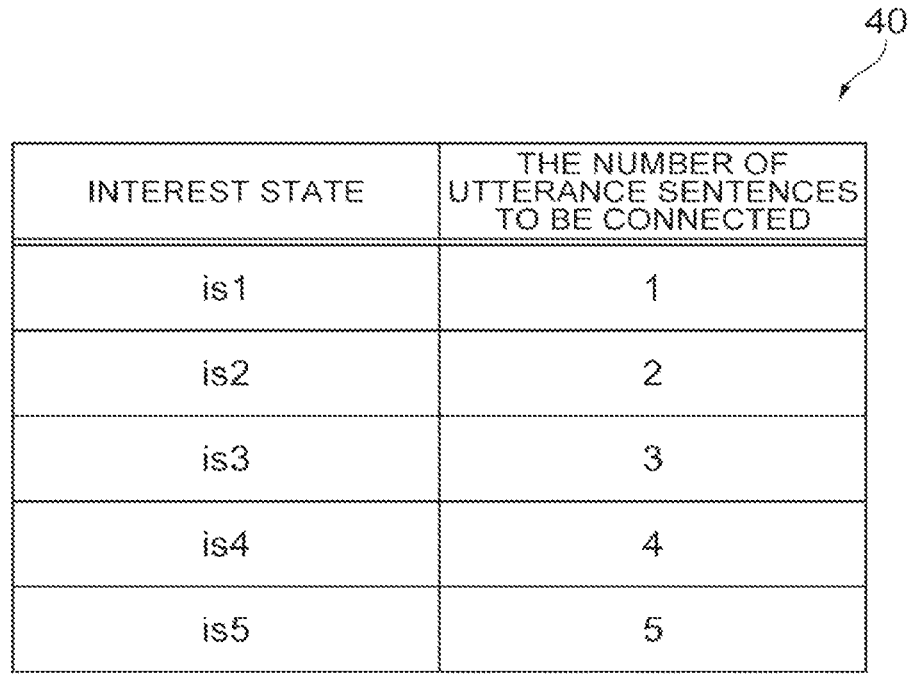
FIG. 3 is a diagram illustrating an example of a configuration of a number of connected sentences table and data stored therein.

The number of connected sentences table 40 is a table in which information indicating the interest state and the number of utterance sentences to be connected are stored in association with each other. FIG. 3 is a diagram illustrating an example of a configuration of the number of connected sentences table 40 and data stored therein. In FIG. 3, interest states is1 to is5 represent scores indicating the degree of the user's interest. For example, in a case where the interest state estimation unit 13 estimates the degree of the user's interest to be the interest state is2, the number of connected sentences determination unit 14 determines that the number of utterance sentences to be connected is "2".

The connected utterance sentence generation unit 15 generates a connected utterance sentence by connecting utterance sentences corresponding to the number determined by the number of connected sentences determination unit 14. The connected utterance sentence generation unit 15 acquires utterance sentences from the utterance sentence DB 50 and connects the acquired utterance sentences.

Figure 4:
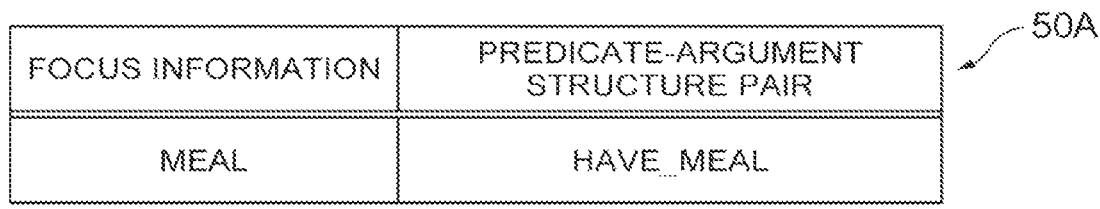
FIG. 4(a) is a diagram illustrating an example of data stored in an utterance sentence DB.
FIG. 4(b) is a diagram illustrating an example of data stored in the utterance sentence DB.
Figure 4:
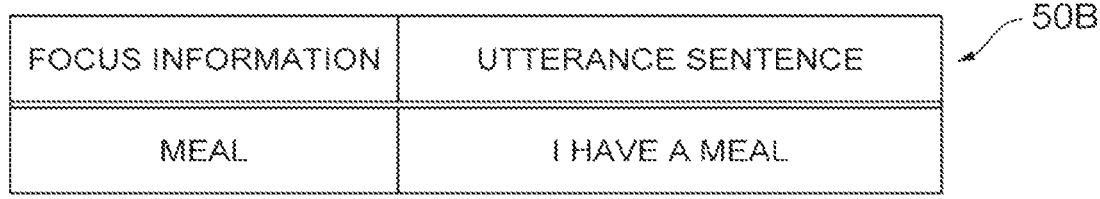

The utterance sentence DB 50 is a database in which utterance sentences are stored. FIGS. 4(*a*) and 4(*b*) are diagrams illustrating an example of a configuration of the utterance sentence DB 50 and data stored therein. As illustrated in FIG. 4(*a*), the utterance sentence DB 50 stores utterance sentence data 50A including a predicate argument structure pair associated with the focus information. The predicate argument structure pair is a pair of a predicate as exemplified in a verb and a term serving as a subject and an object of the predicate. In the present embodiment, the connected utterance sentence generation unit 15 can generate utterance sentences of various forms such as "I have a meal" and "I want to have a meal" by a well-known method on the basis of a predicate argument structure pair "I have_a meal" shown in the utterance sentence data 50A.

In addition, as illustrated in FIG. 4(*b*), the utterance sentence DB 50 may store utterance sentence data 50B having a configuration in which one utterance sentence is associated with focus information.

The connected utterance sentence generation unit 15 may connect a plurality of utterance sentences having subject matter represented by focus information extracted by the focus extraction unit 12. An example of connection of utterance sentences by the connected utterance sentence generation unit 15 will be described below. Here, it is assumed that focus information "meal" is extracted by the focus extraction unit 12 and the number of sentences to be connected "2" is determined by the number of connected sentences determination unit 14. In such a case, the connected utterance sentence generation unit 15 acquires two utterance sentences associated with the focus information "meal" with reference to the utterance sentence DB 50.

Figure 5:
FIG. 5 is a diagram illustrating an example of data stored in the utterance sentence DB.

FIG. 5 is a diagram illustrating an example of a configuration of the utterance sentence DB 50 and utterance sentence data stored therein. The connected utterance sentence generation unit 15 acquires, for example, an utterance sentence "I am hungry" and an utterance sentence "What do you want to have for dinner?" which are associated with the focus information "meal" among utterance sentences shown in utterance sentence data 50C of FIG. 5. The connected utterance sentence generation unit 15 generates a connected utterance sentence "I am hungry. What do you want to have for dinner?" by connecting the two utterance sentences acquired from the utterance sentence DB 50.

Further, in a case where focus information "meal" is extracted by the focus extraction unit 12 and the number of connected sentences determination unit 14 determines that the number of sentences to be connected is "3", the connected utterance sentence generation unit 15 acquires three utterance sentences associated with the focus information "meal" with reference to the utterance sentence DB 50. For example, the connected utterance sentence generation unit 15 acquires an utterance sentence "I am hungry", an utterance sentence "What do you want to have for dinner" and an utterance sentence "Now is the best season for the bamboo shoots" which are associated with the focus information "meal" among the utterance sentences shown in the utterance sentence data 50C. In addition, the connected utterance sentence generation unit 15 generates a connected utterance sentence "I am hungry. What do you want to have for dinner? Now is the best season for the bamboo shoots." by connecting the three utterance sentences acquired from the utterance sentence DB 50.

Meanwhile, naturalness as an utterance sentence may be determined for each of the utterance sentences acquired from the utterance sentence DB 50. The ungrammatical sentence determination unit 16 determines naturalness as an utterance sentence of an utterance sentence acquired from the utterance sentence DB 50 or an utterance sentence generated from a predicate argument structure pair acquired from the utterance sentence DB 50, prior to the generation of a connected utterance sentence by the connected utterance sentence generation unit 15.

Various well-known techniques can be applied to the determination of naturalness as an utterance sentence, and a machine learning method such as deep learning and SVM can be used. As an example, specifically, the ungrammatical sentence determination unit 16 determines naturalness for each utterance sentence using a naturalness determination model for an utterance sentence based on a predetermined feature amount in advance obtained by predetermined machine learning, on the basis of feature amounts of utterance sentences. For example, a vector expression of an utterance sentence may be used for the feature amounts of the utterance sentences, and a known method such as Bag of words or Word2Vec can be applied.

In a case where the naturalness of each of the utterance sentences is determined by the ungrammatical sentence determination unit 16, the connected utterance sentence generation unit 15 may use only utterance sentences which have been determined to have a naturalness equal to or more than a predetermined level by the ungrammatical sentence determination unit 16, for the generation of the connected utterance sentence generation unit 15. Meanwhile, in the utterance sentence generation device 10 of the present embodiment, the ungrammatical sentence determination unit 16 is not an essential component.

The sentence establishment determination unit 17 determines the degree of establishment of a connected utterance sentence generated by the connected utterance sentence generation unit 15 as an utterance sentence. Various well-known techniques can be applied to the determination, and a machine learning method such as deep learning and SVM can be used. As an example, specifically, a plurality of (a large amount of) sentences accompanying an establishment label indicating whether or not a connected utterance sentence is established as a sentence may be prepared. Those sentences are vectorized by a known technique such as Bag of words or Word2Vec and the above-described predetermined machine learning is performed on a pair of the vectored sentence and the establishment label, thereby generating a model for determination. The sentence establishment determination unit 17 outputs a score indicating the degree of establishment as a connected utterance sentence using this model.

In a case where the sentence establishment determination unit 17 determines that a connected utterance sentence is established as a sentence, the output information control unit 18 causes the utterance sentence output unit 20 to output a connected utterance sentence for which the sentence establishment determination unit 17 determines that the degree of establishment as a sentence is equal to or more than a predetermined degree. That is, the output information control unit 18 performs control such that the utterance sentence output unit 20 outputs only a connected utterance sentence for which a score determined by the sentence establishment determination unit 17 is equal to or greater than a predetermined value and so that the utterance sentence output unit 20 does not output a connected utterance sentence for which the score is less than the predetermined value. Meanwhile, in the utterance sentence generation device 10 of the present embodiment, the sentence establishment determination unit 17 and the output information control unit 18 are not essential components.

The connected sentence correction unit 19 unifies styles of utterance sentences included in a connected utterance sentence into a predetermined style. Specifically, for example, the connected sentence correction unit 19 analyzes the styles (for example, an informal style, a formal style, and the like) of the utterance sentences included in the connected utterance sentence by a well-known method. Further, in a case where the connected utterance sentence includes utterance sentences of different styles, the connected sentence correction unit 19 corrects the connected utterance sentence so as to unify the styles. A style into which the styles are to be unified may be, for example, a style of an utterance sentence at the beginning or end of the connected utterance sentence or the most frequent style among the styles of the plurality of utterance sentences included in the connected utterance sentence. In addition, the connected sentence correction unit 19 may determine a style into which the styles are to be unified, on the basis of attribute information of the user.

Figure 6:
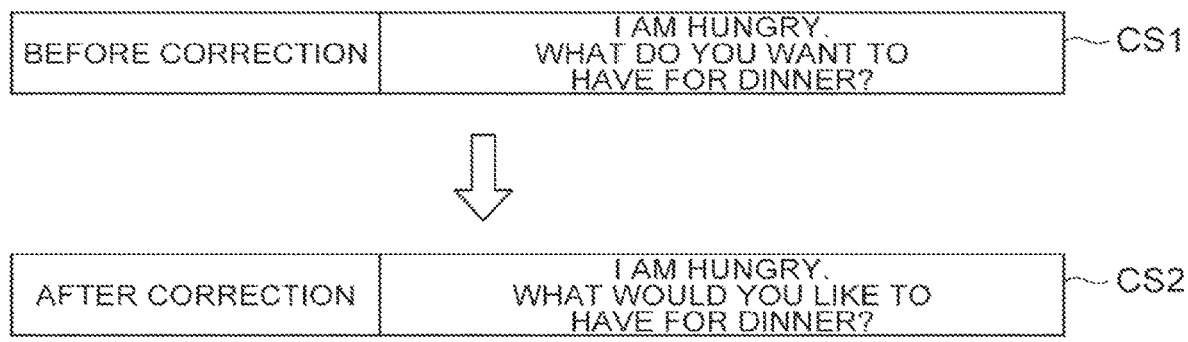
FIG. 6 is a diagram illustrating an example of correction of a connected utterance sentence.

FIG. 6 is a diagram illustrating an example of correction of a connected utterance sentence. As illustrated in FIG. 6, a connected utterance sentence CS1 before correction includes an utterance sentence "I am hungry." of a formal style and an utterance sentence "What do you want to have for dinner?" of an informal style. The connected sentence correction unit 19 can correct the utterance sentence of the informal style in the connected utterance sentence CS1 before correction to the utterance sentence "What would you like to have for dinner?" of the formal style to generate a connected utterance sentence CS2 after correction.

Figure 7:
FIG. 7 is a diagram illustrating an example of correction of a connected utterance sentence.

FIG. 7 is a diagram illustrating an example of correction of a connected utterance sentence in English. As illustrated in FIG. 7, a connected utterance sentence CS21 before correction includes an utterance sentence "May I help you?" of a formal style and an utterance sentence "Open the window?" of an informal style. The connected sentence correction unit 19 can correct the utterance sentence of the informal style in the connected utterance sentence CS21 before correction to the utterance sentence "Could you open the window?" of the formal style to generate a connected utterance sentence CS22 after correction.

In addition, the connected sentence correction unit 19 may impart a predetermined conjunction between utterance sentences included in a connected utterance sentence. Specifically, the connected sentence correction unit 19 performs morphological analysis, syntax analysis, semantic analysis, context analysis and the like using a well-known language processing technique on the utterance sentences included in the connected utterance sentence. For example, the connected sentence correction unit 19 imparts a conjunction between two connected utterance sentences in accordance with a difference in meaning between the two utterance sentences (for example, a difference in positive/negative degree between meanings of the sentences). In addition, the connected sentence correction unit 19 may vectorize each of the connected two utterance sentences and impart a conjunction between the two utterance sentences in accordance with the degree of similarity between the vectors thereof. Meanwhile, in the utterance sentence generation device 10 of the present embodiment, the connected sentence correction unit 19 is not an essential component.

The utterance sentence output unit 20 outputs a connected utterance sentence. Specifically, the utterance sentence output unit 20 outputs an utterance sentence using a sound, text and the like in accordance with the user's utterance acquired by the user utterance acquisition unit 11.

Figure 8:
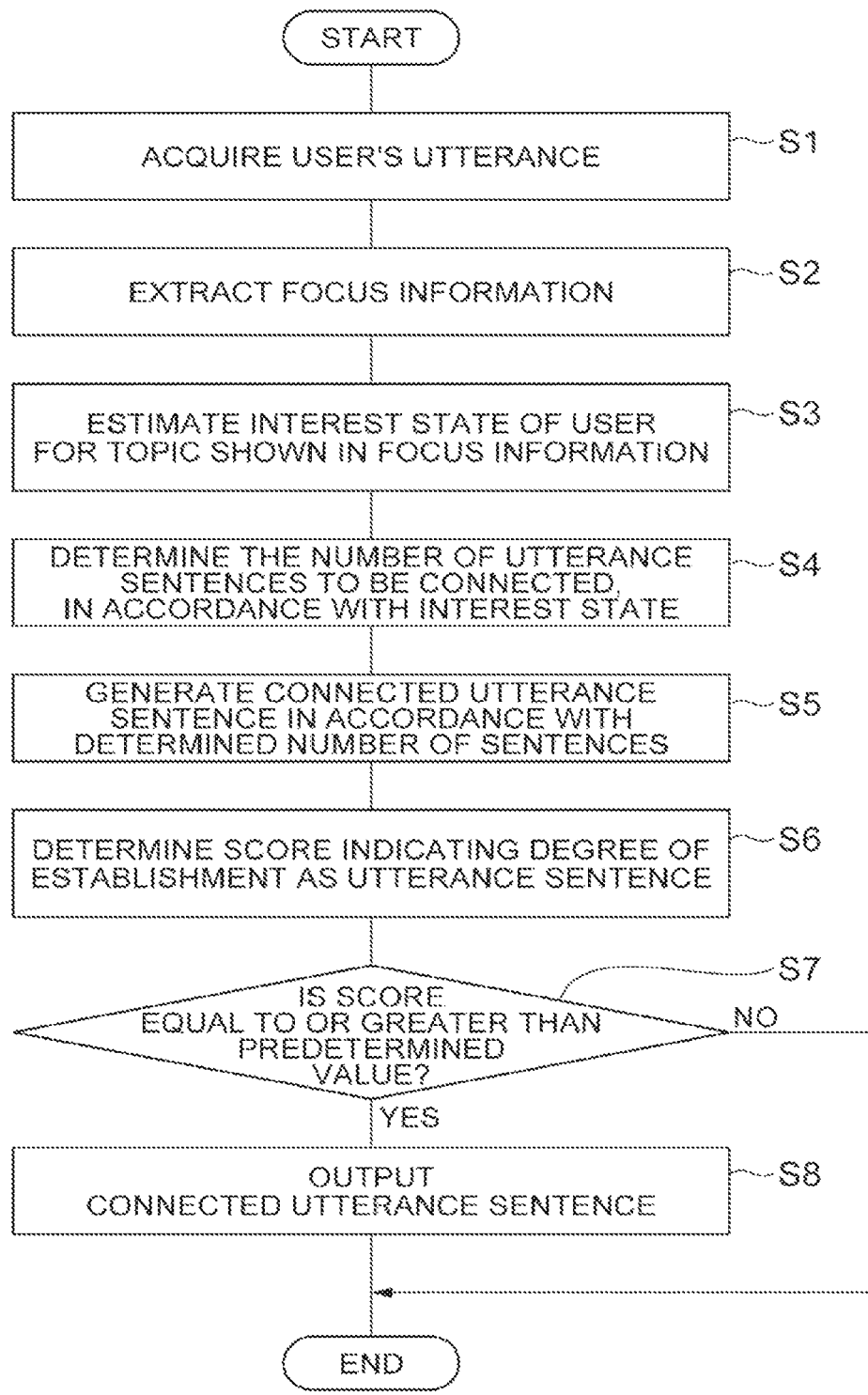
FIG. 8 is a flowchart illustrating processing contents of an utterance sentence generation method of the present embodiment.

Next, an utterance sentence generation method in the utterance sentence generation device 10 will be described with reference to FIG. 8. FIG. 8 is a flowchart illustrating processing contents of the utterance sentence generation method of the present embodiment.

In step S1, the user utterance acquisition unit 11 acquires the user's utterance. In step S2, the focus extraction unit 12 extracts focus information on the user's utterance on the basis of the user's utterance acquired by the user utterance acquisition unit 11 in step S1.

In step S3, the interest state estimation unit 13 estimates an interest state indicating the degree of the user's interest in subject matter represented by the focus information extracted by the focus extraction unit 12 in step S2, on the basis of predetermined detection information on the state of the user.

In step S4, the number of connected sentences determination unit 14 determines the number of utterance sentences to be connected, on the basis of the interest state estimated by the interest state estimation unit 13 in step S3. In step S5, the connected utterance sentence generation unit 15 generates a connected utterance sentence by connecting utterance sentences corresponding to the number determined by the number of connected sentences determination unit 14 in step S4. Meanwhile, prior to the generation of the connected utterance sentence by the connected utterance sentence generation unit 15, the ungrammatical sentence determination unit 16 may determine naturalness as an utterance sentence of the utterance sentence acquired from the utterance sentence DB 50.

In step S6, the sentence establishment determination unit 17 determines a score indicating the degree of establishment of the connected utterance sentence, generated by the connected utterance sentence generation unit 15 in step S5, as an utterance sentence.

In step S7, the output information control unit 18 determines whether or not the score determined in step S6 is equal to or greater than a predetermined value. In a case where it is determined that the score is equal to or greater than the predetermined value, the processing proceeds to step S8. On the other hand, in a case where it is not determined that the score is equal to or greater than the predetermined value, the processing is terminated. Meanwhile, in this flowchart, steps S6 and S7 are not essential processing steps.

In step S8, the utterance sentence output unit 20 outputs the connected utterance sentence generated by the connected utterance sentence generation unit 15 in step S5. Meanwhile, prior to the output of the connected utterance sentence, the connected sentence correction unit 19 may unify styles of utterance sentences included in the connected utterance sentence into a predetermined style or may impart a predetermined conjunction between the utterance sentences included in the connected utterance sentence.

Figure 9:
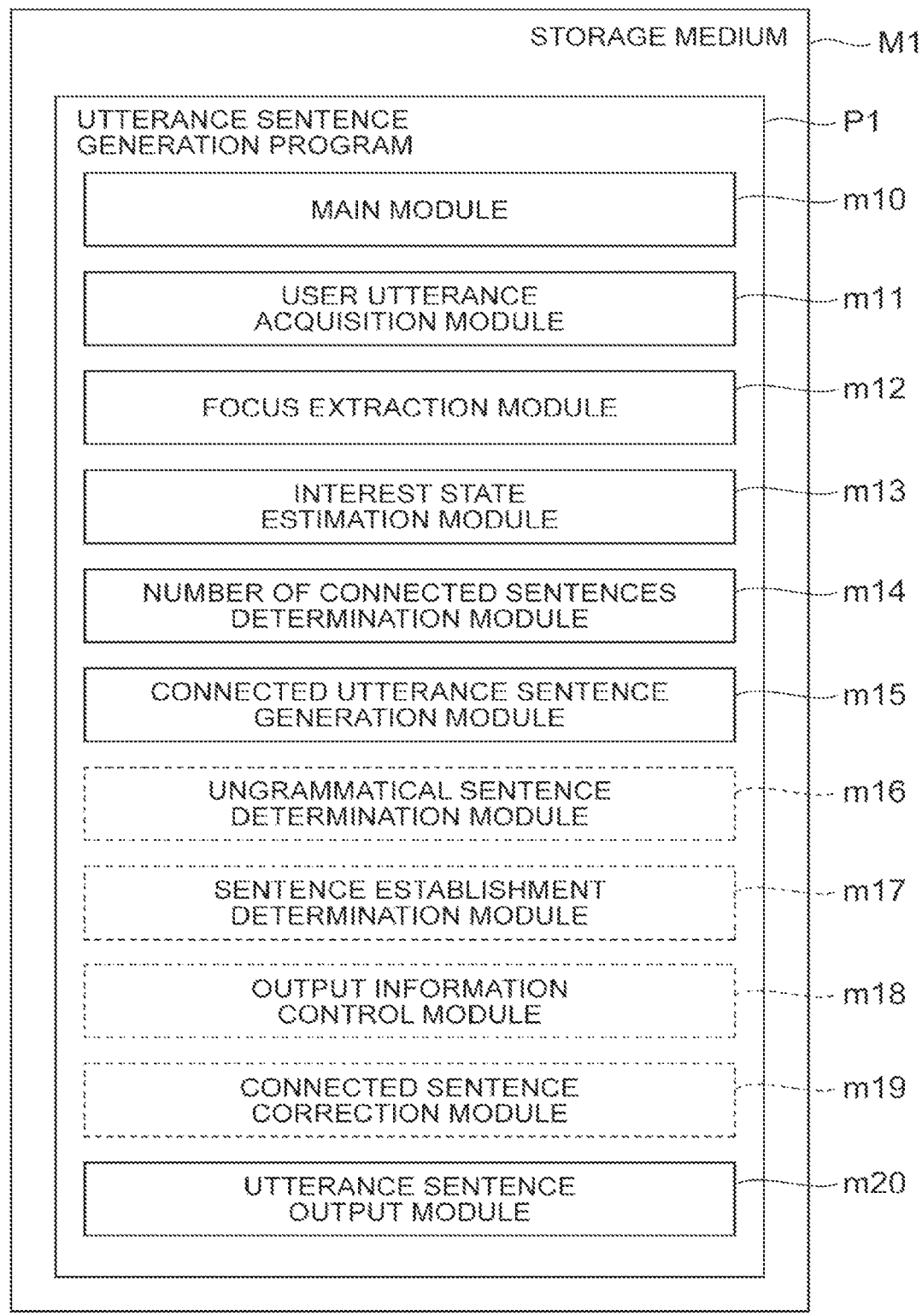
FIG. 9 is a diagram illustrating a configuration of an utterance sentence generation program.

Next, an utterance sentence generation program for causing a computer to function as the utterance sentence generation device 10 of the present embodiment will be described. FIG. 9 is a diagram illustrating a configuration of an utterance sentence generation program P1.

The utterance sentence generation program P1 is configured to include a main module m10 that controls the overall utterance sentence generation process in the utterance sentence generation device 10, a user utterance acquisition module m11, a focus extraction module m12, an interest state estimation module m13, a number of connected sentences determination module m14, a connected utterance sentence generation module m15, an ungrammatical sentence determination module m16, a sentence establishment determination module m17, an output information control module m18, a connected sentence correction module m19 and an utterance sentence output module m20. In addition, functions for the user utterance acquisition unit 11, the focus extraction unit 12, the interest state estimation unit 13, the number of connected sentences determination unit 14, the connected utterance sentence generation unit 15, the ungrammatical sentence determination unit 16, the sentence establishment determination unit 17, the output information control unit 18, the connected sentence correction unit 19 and the utterance sentence output unit 20 in the utterance sentence generation device 10 are realized by the modules m11 to m20. Meanwhile, the utterance sentence generation program P1 may be configured to be transmitted through a transmission medium such as a communication line, or may be configured to be stored in a storage medium M1 as illustrated in FIG. 9. Meanwhile, the ungrammatical sentence determination module m16, the sentence establishment determination module m17, the output information control module m18 and the connected sentence correction module m19 are not essential components in the utterance sentence generation program P1.

In the above-described utterance sentence generation device 10, allocation information generation method and utterance sentence generation program P1 of the present embodiment, focus information representing subject matter of the user's utterance is extracted, and the number of sentences to be connected is determined in accordance with the degree of the user's interest in the focus information. Thereby, a connected utterance sentence with an appropriate length in which the degree of the user's interest is reflected is output.

Further, in the utterance sentence generation device according to another mode, the interest state estimation unit may estimate the interest state on the basis of predetermined detection information on the state of the user.

According to the above-described mode, the degree of interest is estimated in accordance with the state of the user. Therefore, an interest state for the focus information is estimated appropriately.

Further, in the utterance sentence generation device according to another mode, the interest state estimation unit may acquire at least one of an acoustic feature in the user's utterance, the user's gaze, the user's facial expression and contents of the user's utterance as detection information.

According to the above-described mode, the degree of interest is estimated on the basis of various pieces of detection information in which interest states of the user are shown. Therefore, an interest state for the focus information is estimated appropriately.

Further, in the utterance sentence generation device according to another mode, the connected utterance sentence generation unit may connect a plurality of utterance sentences having subject matter represented by the focus information extracted by the focus extraction unit.

According to the above-described mode, a connected utterance sentence is constituted by a plurality of utterance sentences having subject matter represented by the focus information extracted on the basis of the user's utterance, and thus an appropriate utterance sentence is generated as a response to the user's utterance.

Further, in the utterance sentence generation device according to another mode, the number of connected sentences determination unit may determine the number of utterance sentences to be connected with reference to a number of connected sentences table in which information indicating an interest state and the number of utterance sentences to be connected are stored in association with each other.

According to the above-described mode, a number assumed to be preferable as the number of utterance sentences to be connected in accordance with information indicating an interest state is set in the table in advance, and thus it is possible to connect an appropriate number of utterance sentences. In addition, it is possible to determine the number of utterance sentences to be connected only with reference to the table which is set in advance without requiring a special calculation process, and thus a processing load is reduced.

In addition, the utterance sentence generation device according to another mode may further include a sentence establishment determination unit that determines the degree of establishment of a connected utterance sentence as an utterance sentence, and an output information control unit that causes the utterance sentence output unit to output a connected utterance sentence for which the sentence establishment determination unit determines that the degree of establishment as an utterance sentence is equal to or more than a predetermined degree.

According to the above-described mode, a connected utterance sentence for which the degree of establishment as an utterance sentence is less than the predetermined degree is not output. Therefore, a connected utterance sentence which is not appropriate as an utterance sentence is prevented from being used for a response to the user's utterance.

In addition, the utterance sentence generation device according to another mode may further include a connected sentence correction unit that unifies styles of utterance sentences included in a connected utterance sentence into a predetermined style or imparts a predetermined conjunction between utterance sentences.

According to the above-described mode, a connected utterance sentence constituted by a plurality of utterance sentences connected to each other can be configured to be natural as a whole.

Hereinbefore, the present embodiments have been described in detail, but it is apparent to those skilled in the art that the present embodiments should not be limited to the embodiments described in this specification. The present embodiments can be implemented as modified and changed aspects without departing from the spirit and scope of the present invention, which are determined by the description of the scope of claims. Therefore, the description of this specification is intended for illustrative explanation only, and does not impose any limited interpretation on the present embodiments.

The aspects/embodiments described in this specification may be applied to systems employing long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), or other appropriate systems and/or next-generation systems to which these systems are extended on the basis thereof.

The order of the processing sequences, the sequences, the flowcharts, and the like of the aspects/embodiments described above in this specification may be changed as long as they are compatible with each other. For example, in the methods described in this specification, various steps as elements are described in an exemplary order but the methods are not limited to the described order.

Information or the like can be output from an upper layer (or a lower layer) to a lower layer (or an upper layer). Information or the like may be input or output via a plurality of network nodes.

The input or output information or the like may be stored in a specific place (for example, a memory) or may be managed in a management table. The input or output information or the like may be overwritten, updated, or added. The output information or the like may be deleted. The input information or the like may be transmitted to another device.

Determination may be performed using a value (0 or 1) which is expressed by one bit, may be performed using a Boolean value (true or false), or may be performed by comparison of numerical values (for example, comparison thereof with a predetermined value).

The aspects and embodiments described in this specification may be used alone, may be used in combination, or may be switched during implementation thereof. In addition, notification of predetermined information (for example, notification of "X") is not limited to explicit transmission, and may be performed by implicit transmission (for example, the notification of the predetermined information is not performed).

Regardless of whether it is called software, firmware, middleware, microcode, hardware description language, or another name, software can be widely construed to refer to commands, a command set, codes, code segments, program codes, a program, a sub-program, a software module, an application, a software application, a software package, a routine, a sub-routine, an object, an executable file, an execution thread, an order, a function, or the like.

In addition, Software, a command, and the like may be transmitted and received via a transmission medium. For example, when software is transmitted from a web site, a server, or another remote source using wired technology such as a coaxial cable, an optical fiber cable, a twisted-pair wire, or a digital subscriber line (DSL) and/or wireless technology such as infrared rays, radio waves, or microwaves, the wired technology and/or the wireless technology are included in the definition of a transmission medium.

Information, a signal or the like described in this specification may be expressed using any of various different techniques. For example, data, an instruction, a command, information, a signal, a bit, a symbol, and a chip which can be mentioned in the overall description may be expressed by a voltage, a current, an electromagnetic wave, a magnetic field or magnetic particles, an optical field or photons, or any combination thereof.

Meanwhile, the terms described in this specification and/or the terms required for understanding this specification may be substituted by terms having the same or similar meanings.

The terms "system" and "network" which are used in this specification are used interchangeably.

In addition, information, parameters, and the like described in this specification may be expressed as absolute values, may be expressed by values relative to a predetermined value, or may be expressed by other corresponding information.

An expression "on the basis of ~" which is used in this specification does not refer to only "on the basis of only ~," unless otherwise described. In other words, the expression "on the basis of ~" refers to both "on the basis of only ~" and "on the basis of at least ~."

Any reference to elements having names such as "first" and "second" which are used in this specification does not generally limit amounts or an order of the elements. The terms can be conveniently used to distinguish two or more elements in this specification. Accordingly, reference to first and second elements does not mean that only two elements are employed or that the first element has to precede the second element in any form.

Insofar as the terms "include" and "including" and modifications thereof are used in this specification or the claims, these terms are intended to have a comprehensive meaning similarly to the term "comprising." Further, the term "or" which is used in this specification or the claims is intended not to mean an exclusive logical sum.

In this specification, a single device is assumed to include a plurality of devices unless only one device may be present in view of the context or the technique.

In the entire disclosure, a singular form is intended to include a plural form unless the context indicates otherwise.

REFERENCE SIGNS LIST

1 Utterance sentence generation system
10 Utterance sentence generation device
11 User utterance acquisition unit
12 Focus extraction unit
13 Interest state estimation unit
14 NUMBER OF CONNECTED SENTENCES DETERMINATION UNIT 15 Connected utterance sentence generation unit
16 Ungrammatical sentence determination unit
17 Sentence establishment determination unit
18 Output information control unit
19 Connected sentence correction unit
20 Utterance sentence output unit
30 User state acquisition unit
31 Sound acquisition unit
32 Image acquisition unit
40 Number of connected sentences table
50 Utterance sentence DB
M1 Storage medium
m10 Main module
m11 User utterance acquisition module
m12 Focus extraction module
m13 Interest state estimation module
m14 Number of connected sentences determination module
m15 Connected utterance sentence generation module
m16 Ungrammatical sentence determination module
m17 Sentence establishment determination module
m18 Output information control module
m19 Connected sentence correction module
m20 Utterance sentence output module
P1 Utterance sentence generation program

The invention claimed is:

1. An utterance sentence generation system that outputs an utterance sentence for responding to an utterance which is input by a user, the utterance sentence generation system comprising circuitry configured to:
   extract focus information representing at least a portion of subject matter in the user's utterance which is input by the user, on the basis of the user's utterance;
   estimate an interest state indicating a degree of the user's interest in the subject matter represented by the focus information;
   determine the number of utterance sentences to be connected, on the basis of the interest state;
   generate a connected utterance sentence by connecting utterance sentences corresponding to the number determined by the circuitry; and
   output the connected utterance sentence.

2. The utterance sentence generation system according to claim 1, wherein the circuitry estimates the interest state on the basis of predetermined detection information on a state of the user.

3. The utterance sentence generation system according to claim 2, wherein the circuitry acquires at least one of an acoustic feature in the user's utterance, the user's gaze, the user's facial expression and contents of the user's utterance as the detection information.

4. The utterance sentence generation system according to claim 1, wherein the circuitry connects a plurality of utterance sentences having subject matter represented by the focus information extracted by the circuitry.

5. The utterance sentence generation system according to claim 1, wherein the circuitry determines the number of utterance sentences to be connected, with reference to a number of connected sentences table in which information representing the interest state and the number of utterance sentences to be connected are stored in association with each other.

6. The utterance sentence generation system according to claim 1, wherein the circuitry is further configured to:
   determine a degree of establishment of the connected utterance sentence as an utterance sentence; and
   cause the circuitry to output the connected utterance sentence for which the circuitry determines that the degree of establishment as an utterance sentence is equal to or more than a predetermined degree.

7. The utterance sentence generation system according to claim 1, wherein the circuitry is further configured to:
   unify styles of utterance sentences included in the connected utterance sentence into a predetermined style or imparts a predetermined conjunction between the utterance sentences.

8. The utterance sentence generation system according to claim 2, wherein the circuitry connects a plurality of utterance sentences having subject matter represented by the focus information extracted by the circuitry.

9. The utterance sentence generation system according to claim 3, wherein the circuitry connects a plurality of utterance sentences having subject matter represented by the focus information extracted by the circuitry.

10. The utterance sentence generation system according to claim 2, wherein the circuitry determines the number of utterance sentences to be connected, with reference to a number of connected sentences table in which information representing the interest state and the number of utterance sentences to be connected are stored in association with each other.

11. The utterance sentence generation system according to claim 3, wherein the circuitry determines the number of utterance sentences to be connected, with reference to a number of connected sentences table in which information representing the interest state and the number of utterance sentences to be connected are stored in association with each other.

12. The utterance sentence generation system according to claim 2, wherein the circuitry is further configured to:
   determine a degree of establishment of the connected utterance sentence as an utterance sentence; and
   cause the circuitry to output the connected utterance sentence for which the circuitry determines that the degree of establishment as an utterance sentence is equal to or more than a predetermined degree.

13. The utterance sentence generation system according to claim 3, wherein the circuitry is further configured to:
   determine a degree of establishment of the connected utterance sentence as an utterance sentence; and
   cause the circuitry to output the connected utterance sentence for which the circuitry determines that the degree of establishment as an utterance sentence is equal to or more than a predetermined degree.

14. The utterance sentence generation system according to claim 2, wherein the circuitry is further configured to unify styles of utterance sentences included in the connected utterance sentence into a predetermined style or imparts a predetermined conjunction between the utterance sentences.

15. The utterance sentence generation system according to claim 3, wherein the circuitry is further configured to unify styles of utterance sentences included in the connected utterance sentence into a predetermined style or imparts a predetermined conjunction between the utterance sentences.

* * * * *